(No Model.)
P. H. VANDER WEYDE.
APPARATUS FOR COOLING THE ARMATURES OF DYNAMO ELECTRIC MACHINES.
No. 270,518. Patented Jan. 9, 1883.
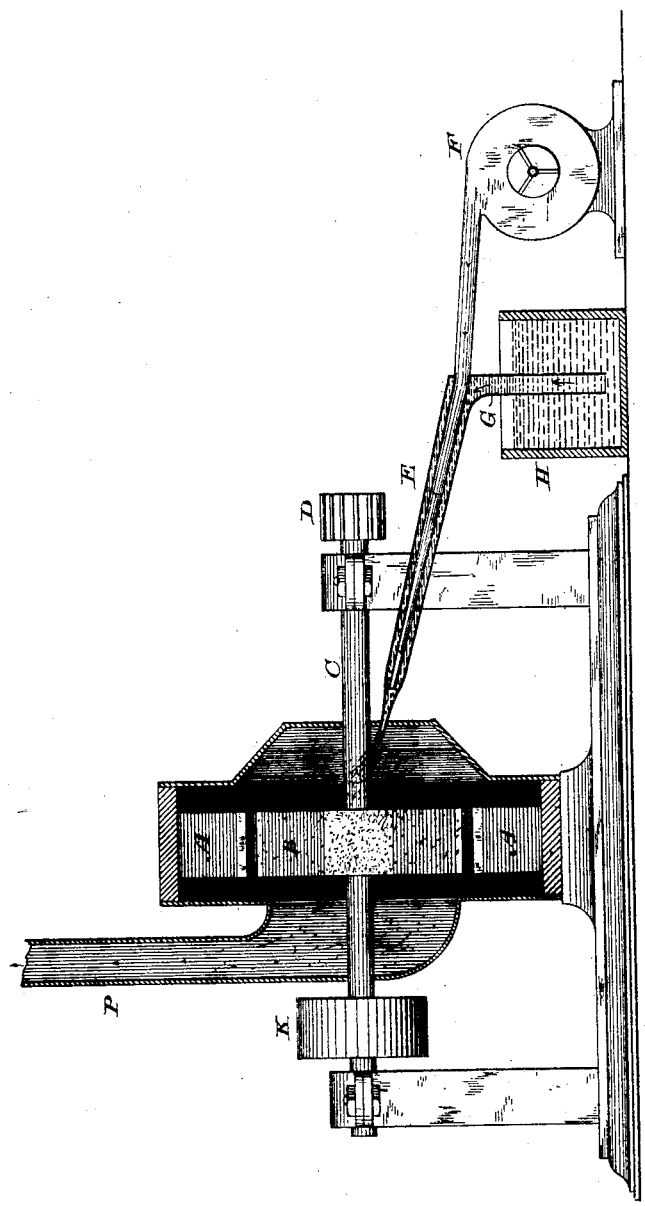
WITNESSES
Wm A. Skinkle
Geo. W. Young
INVENTOR
Peter H. Vander Weyde
By his Attorneys
Baldwin, Hopkins, & Peyton

UNITED STATES PATENT OFFICE.

PETER H. VANDER WEYDE, OF NEW YORK, N. Y., ASSIGNOR TO CHARLES A. CHEEVER, TRUSTEE, OF SAME PLACE.

APPARATUS FOR COOLING THE ARMATURES OF DYNAMO-ELECTRIC MACHINES.

SPECIFICATION forming part of Letters Patent No. 270,518, dated January 9, 1883.

Application filed September 22, 1882. (No model.)

*To all whom it may concern:*

Be it known that I, PETER H. VANDER WEYDE, a citizen of the United States, and a resident of the city, county, and State of New York, have invented an Improved Method of and Apparatus for Cooling the Revolving Armatures of Dynamo-Electric Machines, of which the following is a specification.

Experience has shown that air-currents are far less effective than water-currents for the abstraction of heat, and in many instances air-ventilation for the purpose of cooling revolving armatures of dynamo-electric machines has proved so inadequate as to render the machines to which they were attached failures, from the impossibility of keeping them sufficiently cool. The reason of this is the small capacity for absorbing heat which air has compared with water, this capacity being for equal volumes about three thousand times greater in water than in air—that is to say, one cubic foot of water is capable of carrying off as much heat from the object to be cooled as can be done with three thousand cubic feet of air, the water and air being heated to the same extent. To this must be added the fact that the conductivity of water for heat, small as it is, is far greater than the heat conductivity of air.

It has been attempted to cool the revolving armatures of certain forms of dynamo-electric machines by revolving them in water. This method is objectionable for many reasons, among which is the resistance offered to the rapid revolution of the armature and the forcible churning of the water which develops heat. Every seven hundred and seventy foot-pounds consumed to overcome any resistance produces one unit of heat, as demonstrated by Joules' experiments in England, so that if in overcoming this resistance there is lost, say, a half horse-power, (or its equivalent) sixteen thousand five hundred foot-pounds, the result would be more than twenty units of heat evolved every minute by the hydraulic friction alone, which would add more than 20° of heat every minute to the water passing along the armature. This is of course a serious objection against the use of water in this manner.

I propose to correct the defect of air in regard to its low capacity for absorbing heat by utilizing the well-known property of evaporating water to absorb or make latent large quantities of heat, and I accomplish this by mixing with a current of air a fine spray of water—such as is produced by an atomizer—and injecting this spray with the air between and around the revolving armatures. When used in this way a small quantity of water will go much further than many times its volume when used in the ordinary way, as is explained further below. It should be considered that I do not introduce the water as a vapor, but as a mechanically finely-divided spray, which, when exposed to the heat, will by its evaporation or change into vapor absorb the large amount of heat which is always made latent when water is converted into vapor or steam. Every pound of water thus converted into vapor will carry off as much heat as is carried off by nine hundred and sixty pounds of liquid water when heated 1°, or by ninety-six pounds of liquid water heated 10°. It is thus seen that if water is used to carry off heat by evaporation, it will be far more effective than when used as a liquid without any evaporation. This arrangement is therefore much more effective for keeping revolving armatures cool.

In most forms of dynamo-electric machines it is impracticable to revolve the armature in water; but the introduction of a jet or jets of a mixture of atomized water with air is practicable in every form of machine. Generally the most available place to introduce these jets is near the axis of the revolving armatures, as the centrifugal force of the revolving armature will drive the water to its periphery, while the vapor or steam into which the water spray has been converted escapes through a suitable pipe.

The air-jet of the atomizer may be driven by means of a small centrifugal blower or piston pump of well-known construction, the air carrying with it a spray of water from a suitable reservoir, which spray may be produced by a Giffard injector, or by other well-known atomizing apparatus.

A steam-jet may be used, as is often done for atomizing water for other purposes. In such case the curious anomaly would be put in practice of cooling by steam the revolving armature. Additional air-jets would, however, be necessary in this case, or the steam-jets would have to be so arranged as to carry in additional air.

The accompanying drawing represents a section of a well known form of dynamo-electric generator with my improvement applied thereto.

The stationary magnets A A, the revolving armature B, the driving-pulley K on the axis C, and the commutator D, are all of well-known construction.

Air is driven into an atomizer-jet, E, by a suitable pump or fan, F, and a tube or pipe, G, with its lower end plunged into the water of the tank H, connects with the jet-pipe, so that a spray is produced and delivered, as illustrated, upon the armature. I may place two or more of such jets around the axis of the revolving armature in such positions that the commingled water-spray and air will be blown through the armature and be converted into vapor or steam, which escapes through the pipe P.

It is evident that sprays may be introduced at different points through openings made for the purpose when required, and that other liquids besides water or other liquids mingled with water may be employed without departing from the substance of my invention.

I claim as my invention—

1. The novel method herein described of cooling the revolving armatures of dynamo-electric machines by forcing an atomized spray of liquid upon said armatures when in operation, as set forth.

2. The method herein described of cooling the revolving armatures of dynamo-electric machines by throwing a combined atomized jet of air and liquid spray upon said armatures when in operation, as set forth.

3. The combination, substantially as herein set forth, of the revolving armatures of a dynamo-electric machine with an atomizing apparatus, substantially such as described, for injecting water-spray in or upon said armatures to cool them.

4. The combination, substantially as herein set forth, of the revolving armatures of a dynamo-machine, the water-supply pipe, the spraying-jet pipe, the air-supply pipe, and the fan to throw combined air and water spray upon the armatures to cool them.

5. The combination, substantially as herein set forth, of the revolving armatures of a dynamo-machine, an atomizing or spraying jet-pipe, a water-supply pipe, and an air-blast to force water-spray on the armatures, with an exit-pipe for the escaping vapor.

In testimony whereof I have hereunto subscribed my name this 21st day of September, A. D. 1882.

P. H. VANDER WEYDE.

Witnesses:
WILLARD L. CANDEE,
ROBERT J. CUMMINGS.